March 25, 1924.

N. J. PRITCHARD

SCRAPER ATTACHMENT

Filed Jan. 18, 1923   2 Sheets-Sheet 1

1,488,059

INVENTOR
N. J. Pritchard
By
ATTORNEYS

March 25, 1924. 1,488,059
N. J. PRITCHARD
SCRAPER ATTACHMENT
Filed Jan. 18, 1923  2 Sheets-Sheet 2
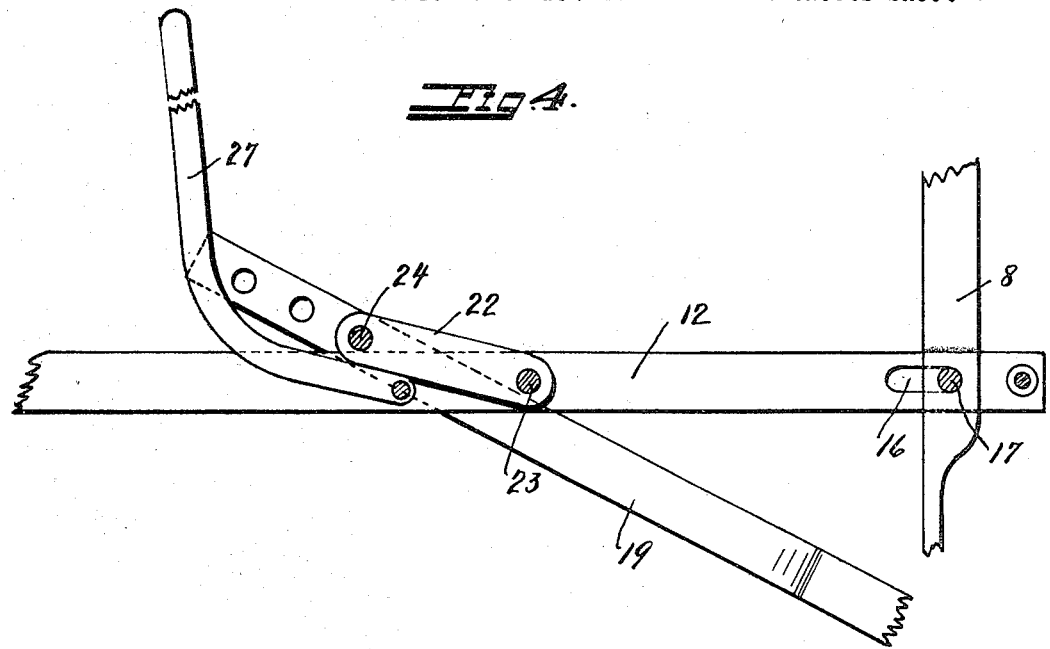
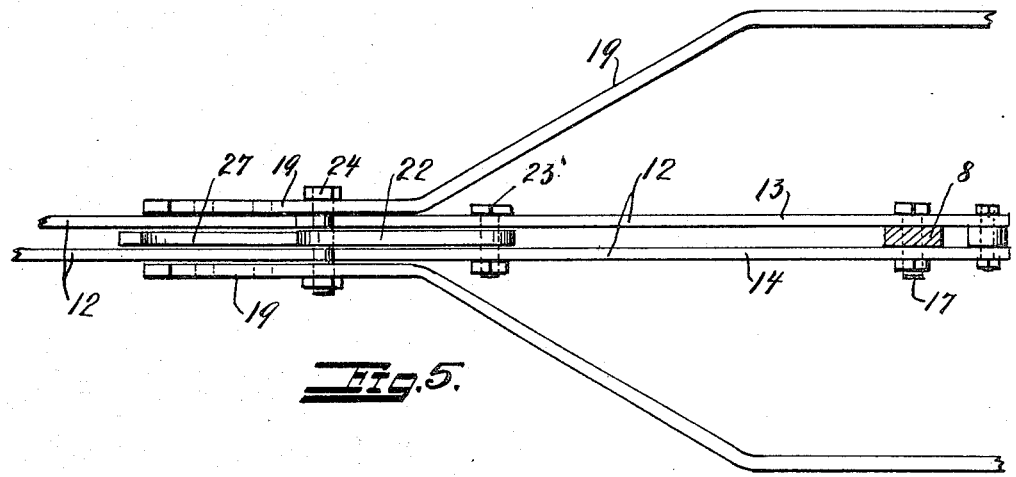
INVENTOR
N. J. Pritchard
BY
ATTORNEYS Patented Mar. 25, 1924.

1,488,059

UNITED STATES PATENT OFFICE.

NATHANIEL JOHNSON PRITCHARD, OF SANTA ROSA, CALIFORNIA, ASSIGNOR OF ONE-FOURTH TO JACOB THOMAS MALLORY AND ONE-FOURTH TO JOHN KIERGAN MALLORY, BOTH OF SANTA ROSA, CALIFORNIA.

SCRAPER ATTACHMENT.

Application filed January 18, 1923. Serial No. 613,461.

*To all whom it may concern:*

Be it known that I, NATHANIEL JOHNSON PRITCHARD, a citizen of the United States, and a resident of Santa Rosa, county of Sonoma, State of California, have invented a new and useful Scraper Attachment, of which the following is a specification.

The present invention relates to improvements in scrapers such as are commonly used for the levelling of agricultural land, the throwing up of dams, excavating of ditches and the like. A scraper particularly adapted for this purpose is the well known Fresno scraper comprising a scoop bucket with a vertical handle secured to its rear end and shoes associated with the front end on which the scraper rides during the dumping operation. The Fresno scraper which was primarily designed as a horse-drawn implement requires for its operation a man behind the scraper who starts the dumping operation by a slight lift on the handle and returns the scraper to an initial position by pulling the handle rearward. Such a scraper, if drawn by a tractor would require the presence of two operators, one to drive the tractor and one man walking behind the scraper to operate the same. My attachment for the scraper is designed to allow the scraper to be handled by the driver of the tractor who rides in front of the scraper and the principal object of the invention is to provide a hinge arrangement allowing of such handling of the scraper.

Figure 1:
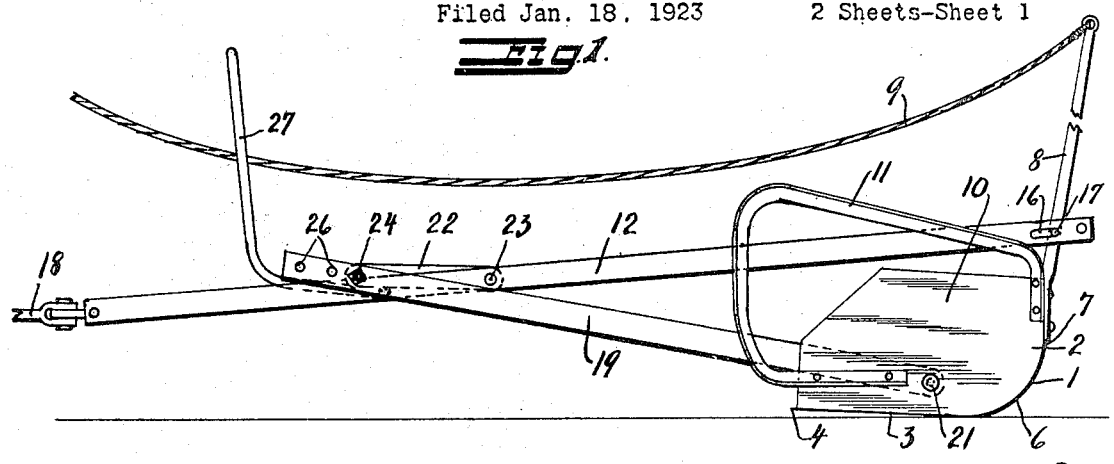
Figure 2:
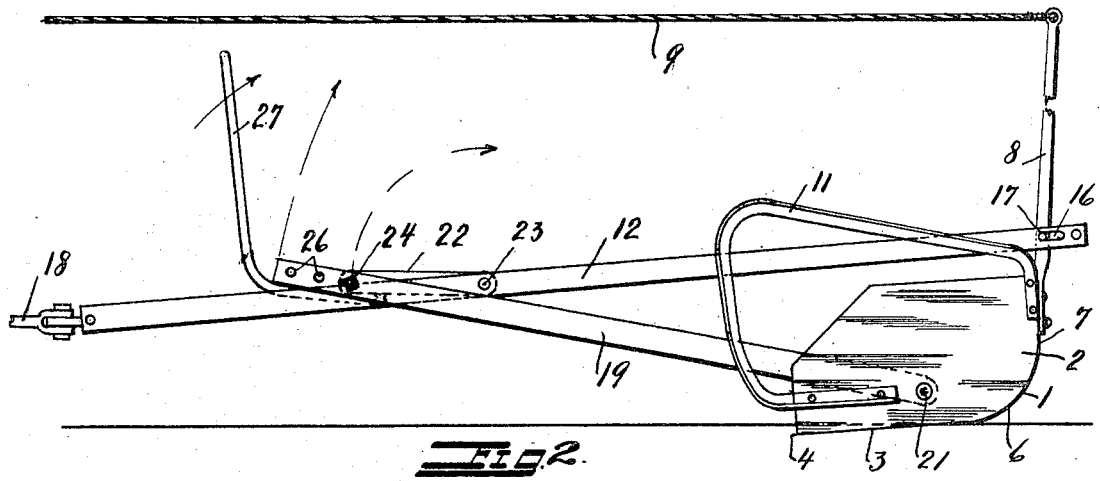
Figure 3:
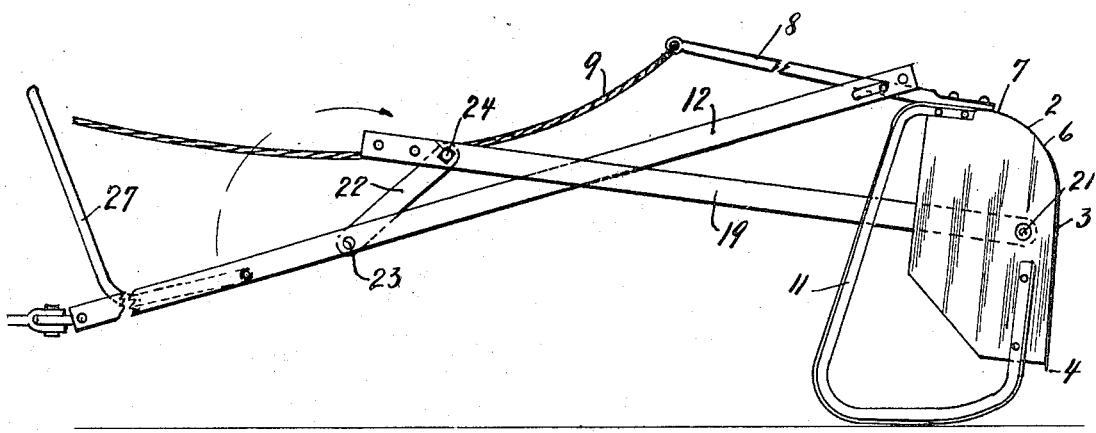

The preferred form of the invention is illustrated in the accompanying drawing, in which Figure 1 shows the scraper with my attachment in side elevation in its normal travelling position, Figure 2 the same scraper slightly tilted ready to pick up a load, Figure 3 the same scraper near the end of the dumping operation, Figure 4 an enlarged detail view, in side elevation, of a lever mechanism and Figure 5 a top plan view of said mechanism. While I have shown only the preferred form of the invention I wish to have it understood that various changes or modifications may be made within the scope of the claims hereto attached without departing from the spirit of the invention. It should be especially understood that my attachment is not confined to the use in connection with the Fresno scraper but may be used on any other scraper working on similar principles.

The scraper (1) is shown as comprising a scoop bucket (2) consisting of a bottom member (3) having a sharp front edge (4) and connecting, through a curve (6) with a vertical rear member (7), from which rises a rather long handle (8) provided with a rope (9). Two side members (10) complete the bucket. A pair of parallel shoes extend forwardly from the side members to turn upwardly at a distance of a few inches from the side members, and rearwardly, as shown at 11, after having risen to a height slightly exceeding that of the bucket. The rear ends of the shoes are bolted or riveted to the upper rear ends of the side members. The device thus far described is the well known Fresno scraper and no novel features are claimed for the same.

My novel attachment consists primarily of a draw bar (12) comprising preferably two parallel members (13) and (14) pivotally engaging the handle (8) slightly above the scoop bucket by means of slots (16) riding on a pin (17). The front end of this draw bar is connected to the tractor, not shown in the drawing, by means of a bar (18). A forked draw bar (19) of considerably shorter length than the main draw bar is pivoted to the sides near the normal center of gravity of the loaded bucket, as shown at (21) and extends forwardly so as to straddle the main draw bar well in front of the scraper. The two bars are pivotally connected by means of a hinge (22), the rear end of which is pivoted to the main draw bar as shown at (23) while the front end is pivoted to the forked draw bar as shown at (24). Several holes (26) are provided to receive the pivot to allow the engagement to be adjusted to scrapers of different sizes and designs.

A normal forward pull on the main draw bar will normally make itself felt through the connecting hinge on the forked draw bar so that the latter substantially assumes the load. For the dumping of the load it is necessary that the load be transferred to the main draw bar which causes the bucket to tilt forwardly, turning first on its center of gravity and later, after the cutting edge has secured a bite, on the latter edge until finally the whole scraper rides on the shoes. To bring about this result I provide the lever handle (27) which is pivoted to the main draw bar at a point slightly below and rearwardly of the pivot (24) in its most forward position. This lever extends forwardly a short distance and then turns upwardly so that its upper end is within convenient reach of the driver. When the latter pushes the lever backward it will raise the pivot (24) and thereby the front end of the forked draw bar (19) until the pivot has passed an imaginary line connecting the pivot (23) with the pivot (21). The pivot (24) will then automatically continue its travel around the pivot (23) due to the rearward pull exerted by the scoop bucket and allow the whole load to be assumed by the draw bar which as a result causes the rear end of the bucket to tilt forward and to dump the load.

To operate the scraper the driver first pulls on the rope (9) thereby tilting the scraper forward from the position shown in Figure 1 to that of Figure 2. This movement may be effected without disturbing the hinge arrangement and only causes the pin (17) to ride forward in the slot (16). The front edge of the scraper now, on a forward motion of the tractor, scrapes the loose dirt into the bucket until the same is filled. The driver then pushes back on the lever handle (27) thereby swinging the pivot (24) upwardly to pass the line connecting the pivots (21) and (23) whereupon the draw bar which now assumes the load commences to tilt the bucket forward and to dump the same in the manner described.

After the load is dumped the driver backs his tractor, thereby pushing the main draw bar (12) rearwardly which causes the scoop bucket to fall back into its original position. During the execution of this movement the pivot (17) which during the dumping operation, as shown in Figure 3, had passed the pivot (21) is thrown rearwardly of the latter pivot, or, to state it in opposite terms, the pivot (21) is thrown forward relative to the pivot (17). This forward thrust of the pivot (21) is communicated to the forked bar (19) which swings the hinge (22) forward on the pivot (23) and causes the pivot (24) to return to its original position shown in Figure 1.

I claim:

1. A scraper comprising a scoop bucket having a bottom member, an end member and two side members, a draw bar pivotally associated with the end member above the normal line of draft, a second bar engaging the side members, a pivoted hinge connecting the bars disposed to normally cause them to cooperate in pulling the load, and means allowing the position of the hinge to be changed whereby the whole load is transferred to the draw bar.

2. A scraper comprising a scoop bucket having a bottom member, an end member and two side members, a draw bar pivotally associated with the end member above the normal line of draft, a second bar engaging the side members, a pivoted hinge connecting the bars normally disposed in the line of draft so as to cause the two bars to cooperate in pulling the load and means allowing the position of the hinge to be changed whereby the whole load is transferred to the draw bar.

3. A scraper comprising a scoop bucket having a bottom member, an end member and two side members, a draw bar pivotally associated with the end member above the normal line of draft, a second bar engaging the side members, a pivoted hinge connecting the bars normally disposed in the line of draft so as to cause the two bars to cooperate in pulling the load, and means for throwing the front end of the hinge upwardly whereby the whole load is transferred to the draw bar.

4. A scraper adapted to be operated by an operator riding in front of the same comprising a scoop bucket having a bottom member, an end member and two side members, a draw bar pivotally associated with the end member above the normal line of draft, a second bar engaging the side members, a pivoted hinge connecting the two bars disposed to normally cause the two bars to cooperate in pulling the load and means disposed within reach of the operator allowing the position of the hinge to be changed whereby the whole load is transferred to the draw bar.

5. A scraper adapted to be operated by an operator riding in front of the same comprising a scoop bucket having a bottom member, an end member and two side members, a draw bar pivotally associated with the end member above the normal line of draft, a second bar engaging the side members, a pivoted hinge connecting the bars normally disposed in the line of draft so as to cause the two bars to cooperate in pulling the load and a lever pivoted to the draw bar adapted to throw the front end of the hinge upward when pushed backward by the operator whereby the whole load is transferred to the draw bar.

6. A scraper comprising a scoop bucket, a draw bar pivotally engaging the same above and rearwardly of its center of gravity, a second bar pivotally engaging the bucket near its center of gravity, a pivoted hinge connecting the two bars disposed to normally cause them to cooperate in pulling the load and means allowing the position of the hinge to be changed whereby the whole load is transferred to the draw bar.

7. A scraper comprising a scoop bucket, a draw bar pivotally engaging the same above and rearwardly of its center of gravity, a second bar pivotally engaging the bucket near its center of gravity, a pivoted hinge connecting the bars normally disposed in the line of draft so as to cause the two bars to cooperate in pulling the load and means for throwing the front end of the lever upwardly whereby the whole load is transferred to the draw bar.

8. A scraper adapted to be operated by an operator riding in front of the same, comprising a scoop bucket, a draw bar pivotally engaging the same above and rearwardly of its center of gravity, a second bar pivotally engaging the bucket near its center of gravity, a pivoted hinge connecting the bars normally disposed in the line of draft so as to cause the two bars to cooperate in pulling the load, and means disposed within the reach of the operator allowing the position of the hinge to be changed whereby the whole load is transferred to the draw bar.

9. A scraper adapted to be operated by an operator riding in front of the same, comprising a scoop bucket, a draw bar pivotally engaging the same above and rearwardly of its center of gravity, a second bar pivotally engaging the bucket near its center of gravity, a pivoted hinge connecting the bars normally disposed in the line of draft so as to cause the two bars to cooperate in pulling the load, and a lever pivoted to the draw bar adapted to throw the front end of the hinge upward when pushed backward by the operator whereby the whole load is transferred to the draw bar.

NATHANIEL JOHNSON PRITCHARD.